(12) United States Patent
Katuyosi

(10) Patent No.: US 6,252,875 B1
(45) Date of Patent: Jun. 26, 2001

(54) MULTI-CAST ABR SERVICE SYSTEM AND METHOD

(75) Inventor: Nyuudou Katuyosi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/139,321

(22) Filed: Aug. 25, 1998

(30) Foreign Application Priority Data

Aug. 26, 1997 (JP) .................................................. 9-244629

(51) Int. Cl.⁷ .................................................. H04L 12/20
(52) U.S. Cl. .......................................... 370/390; 370/232
(58) Field of Search ..................................... 370/232, 390

(56) References Cited

U.S. PATENT DOCUMENTS 5,898,669 * 4/1999 Shimony et al. ..................... 370/232
5,996,013 * 11/1999 Delp et al. ........................... 370/232

FOREIGN PATENT DOCUMENTS 9-149047    6/1997   (JP) .

OTHER PUBLICATIONS

English language translation of Japanese Office Action dated Mar. 2, Hei 11.

\* cited by examiner

*Primary Examiner*—Salvatore Cangialosi
(74) *Attorney, Agent, or Firm*—McGuireWoods, LLP

(57) ABSTRACT

A multi-cast ABR service system comprises a switch for broadcasting a Forward RM cell sent from a sending terminal, multiplexing Backward RM cells sent from receiving terminals so to send the same to the sending terminal, and turning back a Forward RM cell so as to be returned to the sending terminal, an ER table for storing receiving capable rates mounted on the Backward RM cells sent from the switch, and an FRM/BRM converting unit for receiving the Forward RM cell returned from the switch, converting the same Forward RM cell into a Backward RM cell destined to the sending terminal, and sending the Backward RM cell with the receiving capable rate stored in the ER table mounted thereon to the sending terminal.

8 Claims, 8 Drawing Sheets

MULTI-CAST ABR SERVICE SYSTEM AND METHOD

BACKGROUNDS OF THE INVENTION

1. Field Of The Invention

The present invention relates to a multi-cast ABR service system and method for performing multi-cast ABR (Available Bit Rate) services in an ATM (Asynchronous Transfer Mode) network or other network.

2. Description Of The Related Art

This kind of multi-cast ABR service is used so that a plurality of receiving terminals could receive identical information at once after being broadcast from a sending terminal in an ATM or other network.

In the ABR (Available Bit Rate) service in the ATM network, a sending terminal recognizes the cell rate of the user cell capable of being transferred in a given time cycle and sends the cell to a receiving terminal by use of a cell called an RM (Resource Management), cell which is different from the user cell between the sending terminal and the receiving terminal. Thus, it is a service for making good use of the band area of a network while restraining the wasting rate of cell.

More specifically, a sending terminal periodically sends a Forward RM cell (hereinafter, abbreviated as an FRM cell) and a receiving terminal having received the FRM cell returns a Backward RM cell (hereinafter, abbreviated as a BRM cell). The rate capable of being transferred, which is called an ER (Explicit Rate), is set up in the RM cell (including the FRM cell and the BRM cell). The ER is rewritten in a receiving terminal and a switch, depending on the congestion in a network. In performing the multi-cast service by the ABR service using this rate control, it is necessary to put together the BRM cells sent from the respective receiving terminals into one RM cell in a switch which would be a branch point.

There are four conventional methods for putting together the BRM cells. Each method will be described hereinafter.

FIG. 4 is a block diagram showing the structure of a multi-cast ABR service system for realizing one of the above mentioned conventional methods. With reference to FIG. 4, a sending terminal 10 sends a Forward RM cell with some information and the transferable ER mounted thereon, to a switch 400. The switch 400 confirms the destination of the FRM cell according to the VPI and VCI included in the FRM cell sent from the sending terminal 10 and classifies each FRM cell. In the switch 400, ER rewriting units 410 and 430 respectively make a comparison between the ER within the RM cell and the ER set up beforehand and held by the ER rewriting units 410 and 430 and rewrite the ER within the RM cell to take the smaller ER. The switch 400 is provided with buffers 420 and 440 for use in sending the received RM cells. Upon receipt of an FRM cell through the switch 400, a given receiving terminal of the receiving terminals 41, 42, and 43 sends a Backward RM cell toward the sending terminal 10 having sent the FRM cell.

The operation of the multi-cast ABR service system shown in FIG. 4 will be described, this time. FIG. 5 is a flow chart for use in describing the operation of the system shown in FIG. 4. With reference to FIG. 5, the sending terminal 10 sends an FRM cell with the sending rate information [ER0] mounted thereon, to the receiving terminals 41 to 43 (Step 501). The FRM cell sent from the sending terminal 10 is broadcast through the switch 400 to all the receiving terminals 41 to 43 (Step 502). Thus, all the receiving terminals 41, 42, and 43 respectively receive the FRM cell (Step 503).

All the receiving terminals 41, 42, and 43, respectively having received the FRM cell, would try to return each BRM cell to the sending terminal 10. However, it is only the receiving terminal 41 that can return a BRM cell. This is because only a path from the receiving terminal 41 is extended to the sending terminal 10 and no path from the other receiving terminals 42 and 43 is extended to the sending terminal 10, in the structure of FIG. 4.

The receiving terminal 41 sends a BRM cell with the transferable ER [ER1] mounted thereon, to the sending terminal 10 (Step 504). The sending terminal 10 receives the BRM cell (Step 505) and the ER [ER1] within the BRM cell is used so as to perform a rate control of a network for making good use of a band area.

FIG. 6 is a block diagram showing the structure of a multi-cast ABR service system for realizing the other one of the conventional methods. With reference to FIG. 6, the sending terminal 10 sends an FRM cell with some information and the transferable ER mounted thereon to a switch 600. The switch 600 confirms the destination of the FRM cell according to the VPI and VCI included in the FRM cell having sent from the sending terminal 10 and classifies each FRM cell. The ER rewriting units 610 and 630 respectively make a comparison between the ER within the RM cell and the ER set up beforehand and held by the ER rewriting units 610 and 630 and rewrite the ER within the RM cell to take the smaller ER. The switch 600 is provided with buffers 620 and 640 for use in sending the received RM cells.

Upon receipt of the FRM cell through the switch 600, each of the receiving terminals 41, 42, and 43 sends a BRM cell toward the sending terminal 10 having sent the FRM cell. An ER comparison holding unit 650 provided in the switch 600 makes a comparison among the ERs in every received BRM cell and holds the smallest ER in an ER table 660. According to a timing control by a timer 680, the smallest ER being held is notified to a BRM cell generating unit 670. The BRM cell generating unit 670 generates a BRM cell according to the timing control by the timer 680. The timer 680 makes a notification toward the BRM cell generating unit 670 and the ER comparison holding unit 650 in every fixed period of time and controls the operation thereof.

The operation of the multi-cast ABR service system shown in FIG. 6 will be described this time. FIGS. 7 and 8 are flow charts for use in describing the operation of the system shown in FIG. 6. With reference to FIGS. 7 and 8, the sending terminal 10 sends an FRM cell with the sending rate information [ER0] mounted thereon, to the receiving terminals (Step 701). The FRM cell sent from the sending terminal 10 is broadcast through the switch 600 to all the receiving terminals 41 to 43. Thus, all the receiving terminals 41, 42, and 43 respectively receive the FRM cell. In the switch 600, the timer 680 starts counting (Step 702). Thereafter, the timer 680 continues counting to a predetermined value [X] and when the count value becomes [X], the timer 680 notifies it to the ER comparison holding unit 650 and the BRM cell generating unit 670.

All the receiving terminals 41, 42, and 43, each having received the FRM cell, return each BRM cell with the transferable ER for each receiving terminal 41, 42, and 43 mounted thereon, to the sending terminal 10 (Step 703). The ER [ER1] is mounted on the BRM cell as for the receiving terminal 41, the ER [ER5] is mounted on the BRM cell as for the receiving terminal 42, and the ER [ER3] is mounted on the BRM cell as for the receiving terminal 43. Hereinafter, the description will be made on assumption that the BRM cell 1 sent from the receiving terminal 41, the BRM cell 2 sent from the receiving terminal 42, and the BRM cell 3 sent from the receiving terminal 43 would reach the switch 600 in this order.

The BRM cells sent from all the receiving terminals 41, 42, and 43 are sent to the ER comparison holding unit 650, the ERs mounted on the respective BRM cells are compared, and the smallest ER is held in the ER table 660. The ER comparison holding unit 650 makes a comparison of the ERs of the BRM cells successively received and holds the smaller ER selectively (refer to Steps 706, 707, 714, 715, 722, and 723).

As illustrated in FIG. 6, the ER of the BRM cell sent from the receiving terminal 41 is defined as [ER1], the ER of the BRM cell sent from the receiving terminal 42 is defined as [ER5], the ER of the BRM cell sent from the receiving terminal 43 is defined as [ER3], and the size of each ER is defined as ER5<ER1<ER3. In this case, the smallest ER for the sending terminal 10 is obtained as the following procedure.

a) Min {initial table value (ER), ER1}=ER1
b) Min {ER1, ER5}=ER5
c) Min {ER5, ER3}=ER5

If the timer 680 makes a notification toward the ER comparison holding unit 650 and the BRM cell generating unit 670 at the timing of the procedure 3, the smallest ER becomes [ER5] (Step 715), the BRM cell which has been generated in the BRM cell generating unit 670 is sent to the sending terminal 10 with the ER [ER5] mounted thereon (Steps 725 to 727). The value for the sending terminal 10 in the ER table 660 is rewritten into the initial value.

Further, in the other multi-cast ABR service system of the conventional methods, all the receiving terminals having received the FRM cells would return each BRM cell. A switch judges the sending source (receiving terminal) of the respective BRM cell every time of receiving a BRM cell. By comparison of the ERs of the respective BRM cells, the smaller ER is held. After receiving the BRM cells from all the receiving terminals, the smallest ER left in the last comparison is mounted on the BRM cell received last, which is sent to the sending terminal.

Further, the other multi-cast ABR service system of the conventional methods is provided with a switch counter for counting every time of receiving BRM cells. The counter counts the number of all the receiving terminals. The switch makes a comparison of the ERs of the received BRM cells until the counter counts to the number of all the receiving terminals, and holds the smaller ER in every comparison. After the count number becomes the number of all the receiving terminals, the smallest ER left through the last comparison is mounted on the BRM cell received last, which is sent to the sending terminal.

The above conventional techniques, however, have the following problems.

The first conventional technique shown in FIGS. 4 and 5, provided with only one predetermined receiving terminal that can send a BRM cell, is defective in that the transferable ERs of the other receiving terminals cannot be reflected in a sending terminal. This is why a path for sending a BRM cell from a receiving terminal to a sending terminal is extended only from one receiving terminal and no path is extended from the other receiving terminals.

The second conventional technique shown in FIGS. 6 to 8 is defective in that the structure of a switch becomes complicated because the switch needs a function of generating a BRM cell. The smallest ER must be added to the generated BRM cell and it must be sent to a sending terminal.

The third conventional technique is incapable of sending a BRM cell through a switch to a sending terminal unless the switch receives all the BRM cells sent from the respective receiving terminals. Therefore, if the switch fails to receive even one BRM cell of all, the sending terminal cannot receive the BRM in reply to the sent FRM cell, thereby causing deterioration in reliability of a system.

In the fourth conventional technique, a switch sends a BRM cell to a sending terminal only in case of receiving the same number of BRM cells as the number of the all receiving terminals. Therefore, a counter for counting the number of received BRM cells must be provided in the switch, which makes the structure of the switch complicated. Further, if the number of the received BRM cells doesn't meet the number of all the receiving terminals, a sending terminal cannot receive the BRM corresponding to the FRM cell sent by the own self, thereby causing deterioration in reliability of a system.

SUMMARY OF THE INVENTION

An object of the present invention is, in order to solve the above problems, to provide a multi-cast ABR service system and method capable of reflecting the receiving capable rates of all the receiving terminals in a sending terminal, without making the structure of a switch complicated.

Another object of the present invention is to provide a multi-cast ABR service system and method improved in reliability of the system, which is capable of returning a BACKWARD RM cell to a sending terminal even in such a state that all the BACKWARD RM cells sent from the respective receiving terminals are not getting to the switch.

According to one aspect of the invention, a multi-cast ABR service system for performing multi-cast ABR services between a sending terminal and a plurality of receiving terminals connected together, comprises switching means for, upon receipt of a Forward RM cell sent from the sending terminal, broadcasting the Forward RM cell to the destination that is the plurality of receiving terminals, upon receipt of Backward RM cells returned from the respective receiving terminal to the sending terminal, multiplexing the Backward RM cells and send the same to the sending terminal, and turning back the Forward RM cell sent from the sending terminal so as to be returned to the sending terminal, rate storing means for storing receiving capable rates mounted on the Backward RM cells sent from the switching means, and RM cell converting means receiving the Forward RM cell returned from the switching means for converting the corresponding Forward RM cell into a Backward RM cell destined to the sending terminal and sending the Backward RM cell with the receiving capable rate stored in the rate storing means mounted thereon to the sending terminal.

In the preferred construction, the RM cell converting means, when receiving a Forward RM cell from the switching means, converts the Forward RM cell into a Backward RM cell and sends the Backward RM cell to the switching means, and when receiving a Backward RM cell from the switching means, extracts receiving capable rate of the Backward RM cell and stores the rate into the rate storing means.

In another preferred construction, the RM cell converting means receives Backward RM cells of the respective receiving terminals sequentially sent from the switching means, makes a comparison between the respective receiving capable rates within the received Backward RM cells and the rate already stored in the rate storing means, in the receiving order, when the receiving capable rate within a Backward RM cell is smaller than the rate stored in the rate storing means, rewrites the rate in the rate storing means into the receiving capable rate within the Backward RM, and otherwise, holds the rate that is stored in the rate storing means.

In another preferred construction, the RM cell converting means receives Backward RM cells of the respective receiving terminals sequentially sent from the switching means, makes a comparison between the respective receiving capable rates within the received Backward RM cells and the rate already stored in the rate storing means, in the receiving order, when the receiving capable rate within a Backward RM cell is smaller than the rate stored in the rate storing means, rewrites the rate in the rate storing means into the receiving capable rate within the Backward RM cell, otherwise, holds the rate that is stored in the rate storing means, and when receiving the Forward RM cell for the sending terminal from the switching means, the rate stored in the rate storing means at the point is mounted on the Backward RM cell which the Forward RM cell is converted into.

In another preferred construction, the rate storing means stores the maximum value of transferable rate as an initial value.

According to another aspect of the invention, a multi-cast ABR service method for notifying receiving capable rates of respective receiving terminals to a sending terminal, in a multi-cast ABR service system for performing multi-cast ABR services between the sending terminal and the plurality of receiving terminals connected together, the method comprising a step of respectively extracting the receiving capable rates of the receiving terminals from the Backward RM cells which are sent from the receiving terminals in reply to the Forward RM cell sent from the sending terminal and storing the rates, a step of turning back the Forward RM cell sent from the sending terminal so as to be returned to the sending terminal, a step of converting the Forward RM cell returned from the switching means toward the sending terminal into a Backward RM cell destined to the sending terminal, and a step of mounting the receiving capable rate extracted in the rate extracting step on the converted Backward RM cell.

In the preferred construction, the rate storing step further includes a step of sequentially making a comparison of the receiving capable rates within Backward RM cells sent from the respective receiving terminals, a step of rewriting the rate to be stored into the receiving capable rate extracted from the Backward RM cell when the receiving capable rate extracted from a Backward RM is smaller than the rate already stored, and a step of, otherwise, holding the rate already stored.

In another preferred construction, the rate storing step further includes a step of sequentially making a comparison of the receiving capable rates within Backward RM cells sent from the respective receiving terminals, a step of rewriting the rate to be stored into the receiving capable rate extracted from the Backward RM cell when the receiving capable rate extracted from a Backward RM is smaller than the rate already stored, and a step of, otherwise, holding the rate already stored, and in the receiving capable rate mounting step, when the Forward RM cell sent from the sending terminal is returned to the switching means, the receiving capable rate stored at the point in the rate storing step is mounted on the Backward RM cell which the Forward RM cell is converted into.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
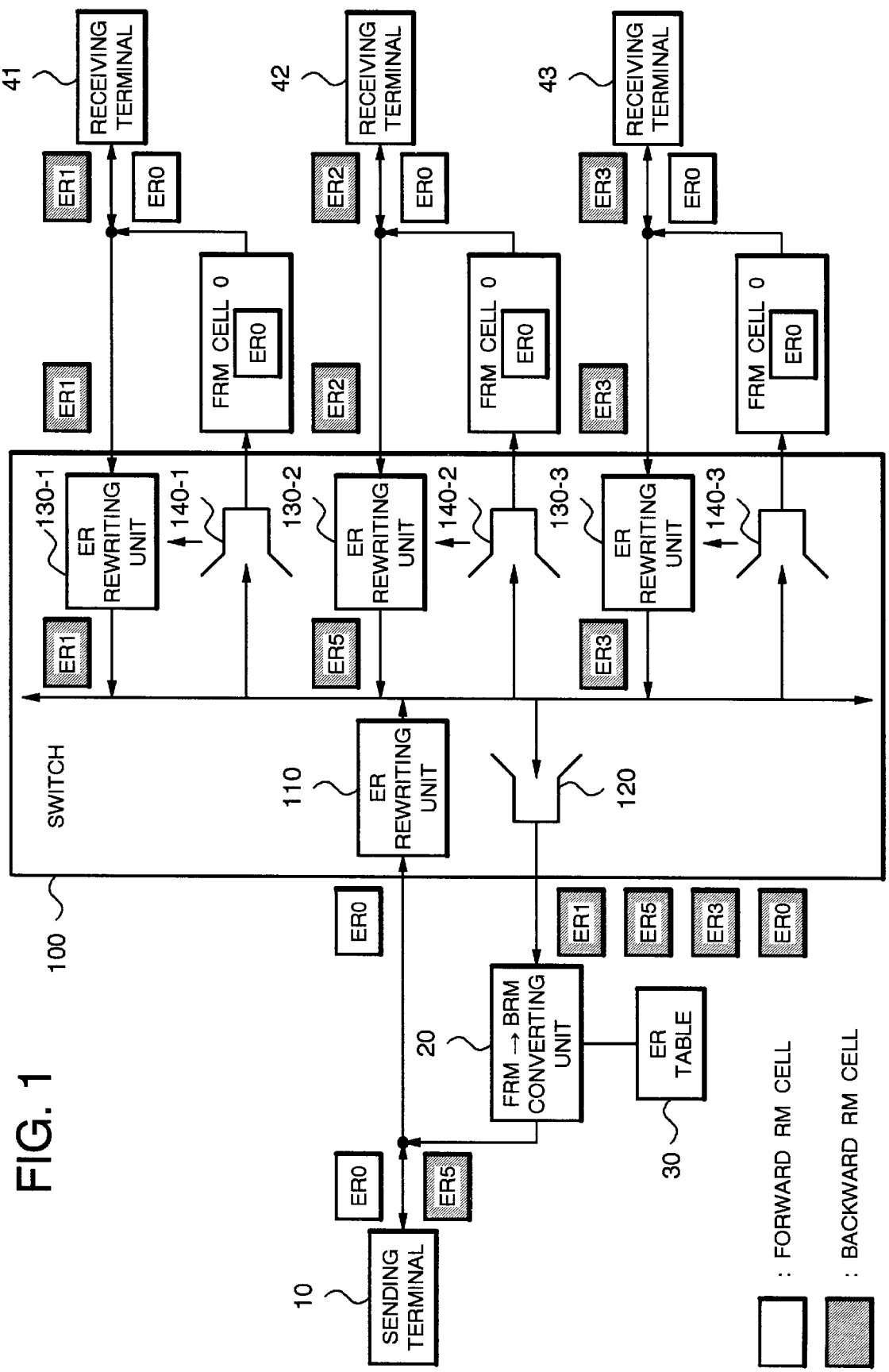
FIG. 1 is a block diagram showing the structure of a multi-cast ABR service system according to an embodiment of the present invention.

FIG. 1 is a block diagram showing the structure of a multi-cast ABR service system according to an embodiment of the present invention. The multi-cast ABR service system of the embodiment establishes N-vs-1 connection for Backward RM cells, from a plurality (N) of receiving terminals to one sending terminal. An ER table for holding a receiving capable ER is provided at a point multiplexed by N where N paths combine into one path. In receipt of the BRM cells from the respective receiving terminals at the corresponding multiplex point, each of the received ERs within the BRM cells is compared with the receiving ER held in the ER table, and the smaller ER is rewritten in the ER table successively. Thus, the receiving ERs of all the receiving terminals can be reflected in the sending terminal.

The Forward RM cell sent from the sending terminal is broadcast to the respective receiving terminals and it is also turned up to the sending terminal itself on the way and returned there. The turned up FRM cell is converted in a BRM cell at the multiplex point where the ER table exists and the ER within the RM cell is rewritten into the receiving capable ER held in the table, which is back to the sending terminal. Therefore, it is not necessary to generate a BRM cell in the switch.

With reference to FIG. 1, the multi-cast ABR service system of the embodiment comprises a switch 100 for connecting one sending terminal 10 with a plurality (three) of receiving terminals 41, 42, and 43, an FRM/BRM converting unit 20 provided in the switch 100 on the output side of the sending terminal 10, for converting an FRM cell into a BRM cell, and an ER table 30 which is referred to by the FRM/BRM converting unit 20. In this embodiment, respectively receiving an FRM cell, all the receiving terminals 41, 42, and 43 return each BRM cell to the sending terminal 10 having sent the corresponding FRM cell. FIG. 1 shows only the characteristic components in the embodiment, and the description of the other general components is omitted there. Although three receiving terminals 41, 42, and 43 are shown in FIG. 1, the number of the receiving terminals is not restricted to this example according to the embodiment. The number of the sending terminals 10 is not restricted to one as shown in FIG. 1.

The sending terminal 10 sends an FRM cell with some information and the transferable ER mounted thereon. In the illustrated example, the FRM cell with the ER [ER0] mounted thereon is sent to the switch 100. Initially, the ER [ER0] is set at the maximum value (MAX rate) of the transferable rate.

The receiving terminals 41, 42, and 43 return the respective BRM cells with the transferable ER mounted thereon to the sending terminal 10, upon receipt of the FRM cell sent from the sending terminal 10. In the illustrated example, the receiving terminal 41 sends the BRM cell with the ER [ER1] mounted thereon, the receiving terminal 42 sends the BRM cell with the ER [ER2] mounted thereon, and the receiving terminal 43 sends the BRM cell with the ER [ER3] mounted thereon respectively to the sending terminal 10.

Receiving the FRM cell sent from the sending terminal 10, the switch 100 confirms the destination (receiving terminals 41, 42, 43) of the same FRM cell based on the VPI and VCI included in the same FRM cell and broadcasts it. At once, the switch 100 receives each BRM sent from the receiving terminals 41, 42, and 43, confirms the destination (sending terminal 10) of the BRM cell based on the VPI and VCI included in the same BRM cell, and multiplexes the BRMs so to send the same to the sending terminal 10. The switch 100 turns up the FRM cell sent from the sending terminal 10 so to return it to the sending terminal 10 itself.

The switch 100 is provided with ER rewriting units 110 and 130, and buffers 120 and 140. The ER rewriting unit 110 receives an FRM cell sent from the sending terminal 10, while each ER rewriting unit 130 receives each BRM cell sent from the respective receiving terminals 41, 42, and 43, and the both units rewrite the ER depending on the necessity. More specifically, the assured ER in each connection route between the sending terminal 10 and the respective receiving terminals 41, 42, and 43 is previously set up and held in the ER rewriting units 110 and 130. When the ER of the received RM cell is larger than the assured ER, the ER of the same RM cell is rewritten into the assured ER. The number of the ER rewriting units 130 to be provided depends on the number of the receiving units. In the following description, when it is necessary to distinguish each ER rewriting unit 130 from each other, a numerical subscript is attached to the numeral as illustrated in FIG. 1 (for example, ER rewriting unit 130-1).

The FRM/BRM converting unit 20 is provided in the switch 100 on the output side of the sending terminal 10, for converting the FRM cell which was sent from the sending terminal 10 and turned up by the switch 100, into a BRM cell. At this time, referring to the ER table 30, the unit 20 mounts the held ER on the converted BRM cell.

The FRM/BRM converting unit 20 also extracts the ER mounted on the BRM cell sent from the switch 100 to the sending terminal 10 and makes a comparison between the ER held in the ER table 30 and the received ER. When the received ER is smaller, the ER of the ER table 30 is rewritten into the received ER.

The ER table 30 holds each ER for every sending terminal 10 when there are a plurality of sending terminals 10. The initial value is set up at the maximum value (MAX rate) of the transferable ER.

The operation of the embodiment will be described this time.

As the initial condition, the assured ERs [ER4], [ER5], and [ER6] are respectively set up in the ER rewriting units 130-1, 130-2, and 130-3. The relationship between the respective ERs [ER4], [ER5], and [ER6] and the respective ERs [ER1], [ER2], and [ER3] mounted on the BRM cells sent from the respective receiving terminals 41, 42, and 43 is represented as follows:

ER1≦ER4

ER2>ER5

ER3≦ER6 Therefore, the ER within the BRM cell to be sent from the receiving terminal 42 is rewritten from [ER2] to [ER5] by the ER rewriting unit 130-2 in the switch 100.

When the FRM cell sent from the sending terminal 10 is broadcast to the receiving terminals 41, 42, and 43 through the switch 100, the BRM cells are sent from the all receiving terminals 41, 42, and 43 to the sending terminal 10. Assume that the switch 100 receives the BRM cell 1 sent from the receiving terminal 41, the BRM cell 2 sent from the receiving terminal 42, and the BRM cell 3 sent from the receiving terminal 43 in this order and that the relationship among the ER [ER1] within the BRM cell 1, the ER [ER3] within the BRM cell 3 and the ER [ER5] within the BRM cell 2 rewritten by the ER rewriting unit 130-2 is defined as

ER5 <ER1 <ER3.

Therefore, the FRM/BRM converting unit 20 receives the BRM cell 1, the BRM cell 2, and the BRM cell 3 in this order and the ER will be written in the ER table 30 in the following procedure.

a) Min {initial table value, ER1}=ER1 b) Min {ER1, ER5}=ER5 c) Min {ER5, ER3}=ER5

Namely, after receiving the BRM cell 3, the ER of the ER table 30 becomes [ER5].

Next, the sending terminal 10 sends another FRM cell. The FRM cell is broadcast to the respective receiving terminals 41, 42, and 43 and it is turned up by the switch 100 to the FRM/BRM converting unit 20. Upon receipt of the FRM cell, the FRM/BRM converting unit 20 converts the FRM cell into the BRM cell destined to the sending terminal 10, and referring to the ER table 30, mounts the ER [ER5] corresponding to the sending terminal 10 on the BRM cell so to send it to the sending terminal 10.

Figure 2:
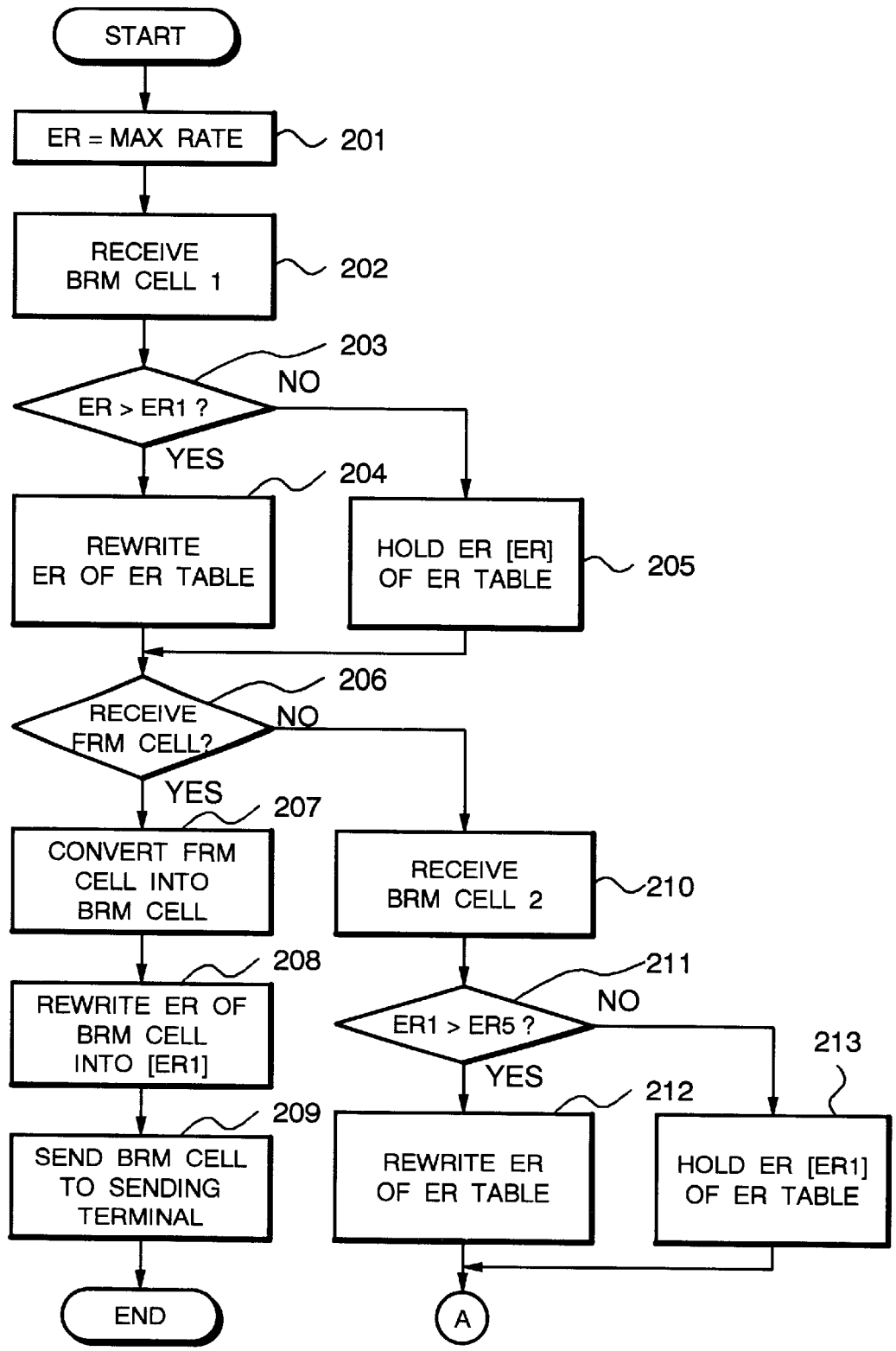
FIG. 2 is a flow chart for use in describing the operation of the embodiment.
Figure 3:
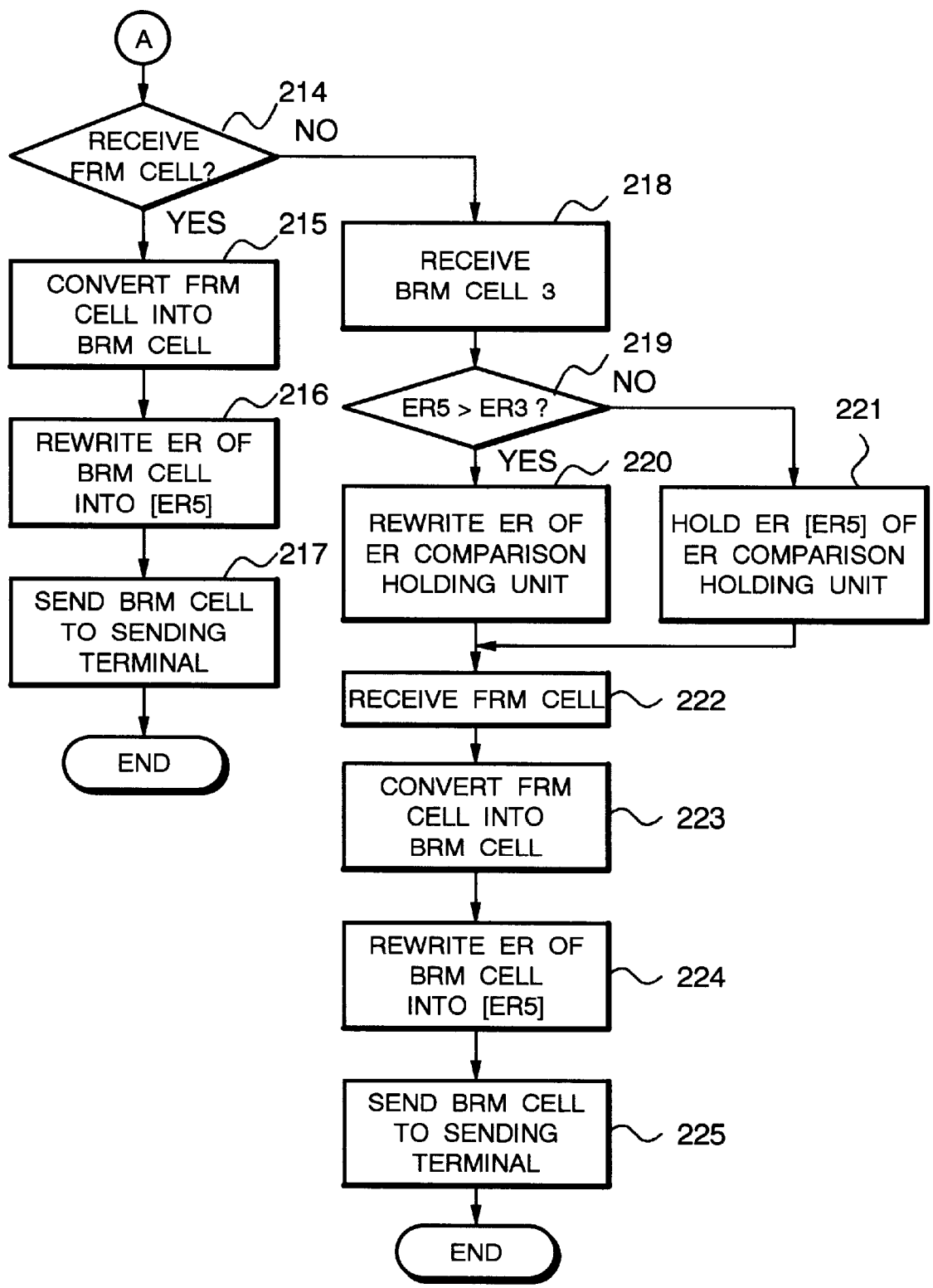
FIG. 3 is a flow chart for use in describing the operation of the embodiment.
Figure 4:
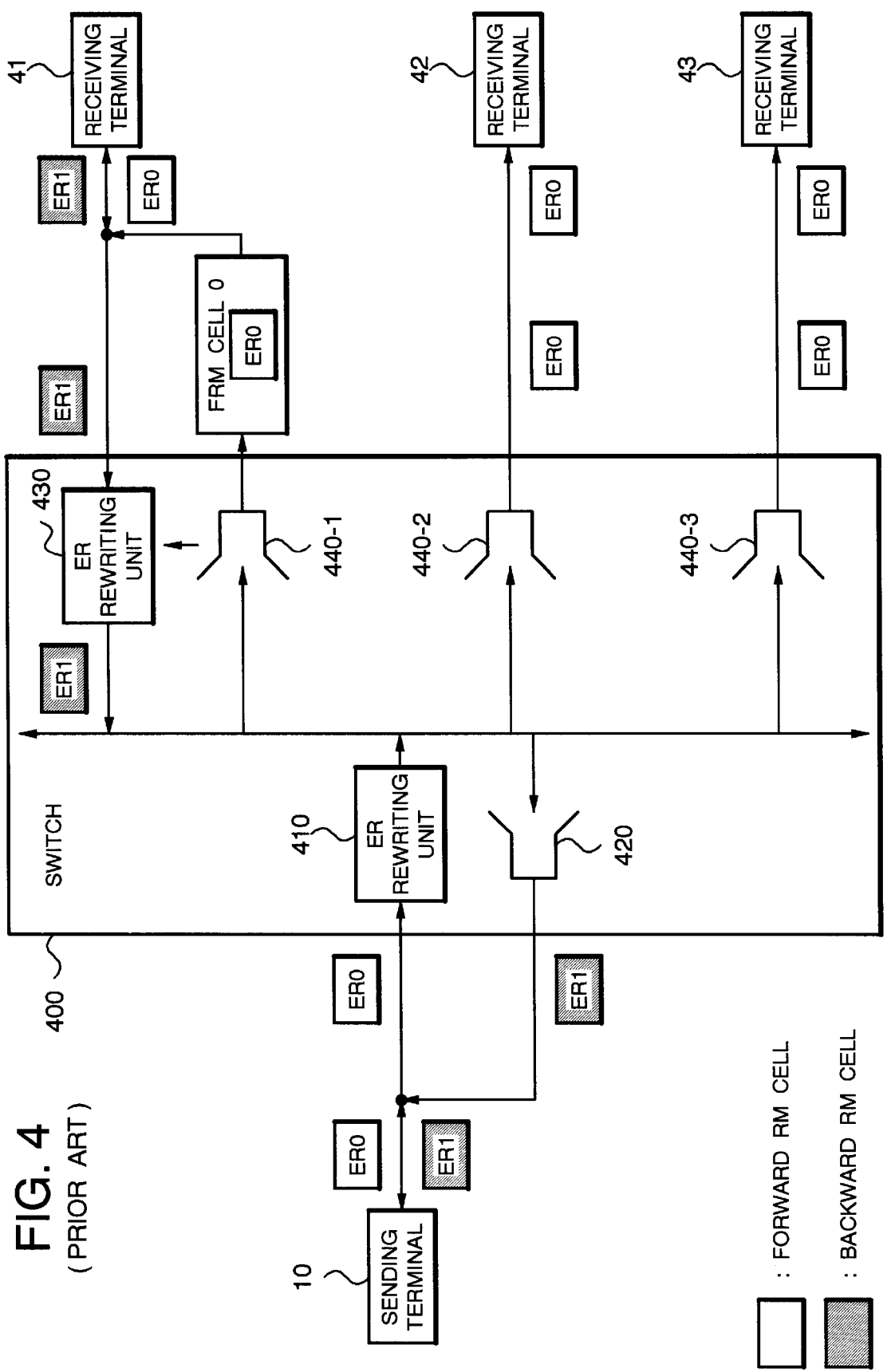
FIG. 4 is a block diagram showing an example of the structure of the conventional multi-cast ABR service system.
Figure 5:
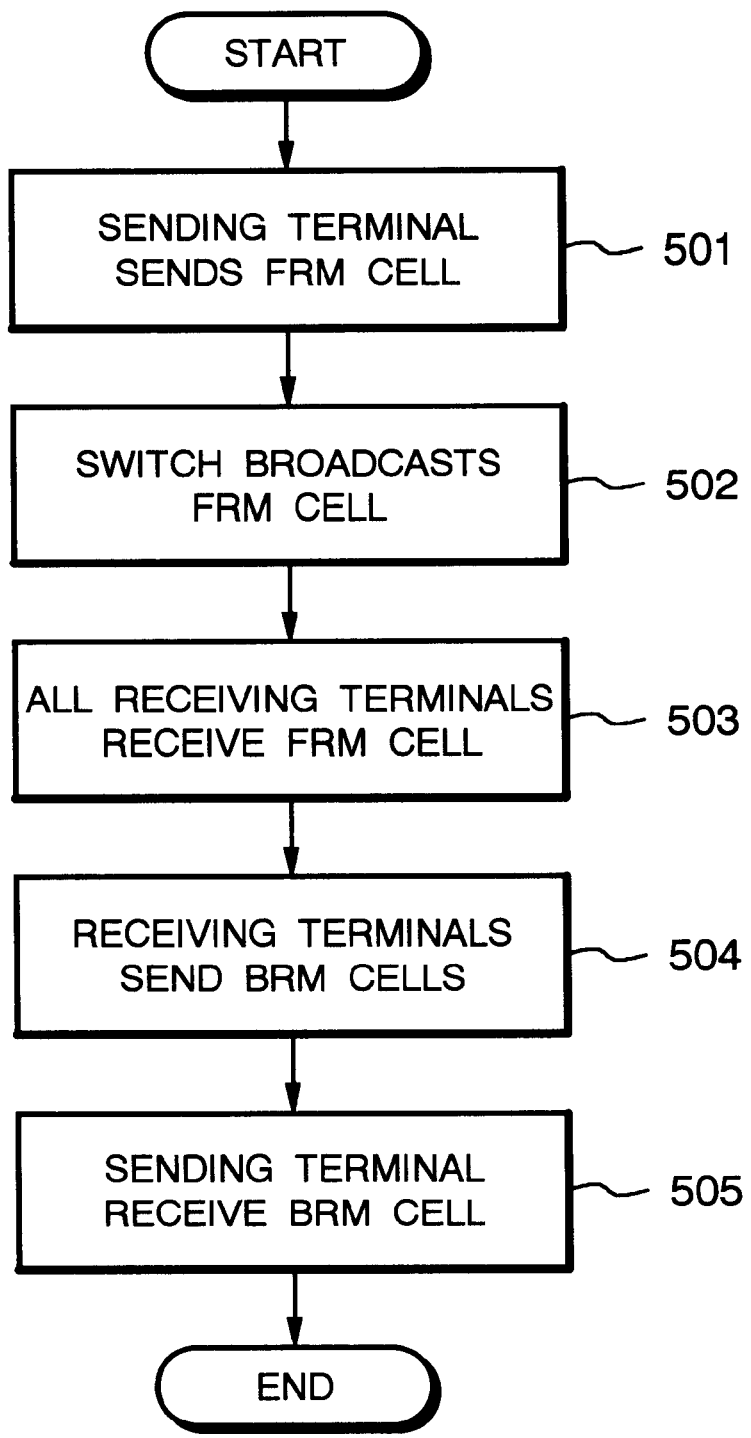
FIG. 5 is a flow chart showing the operation of the multi-cast ABR service system shown in FIG. 4.
Figure 6:
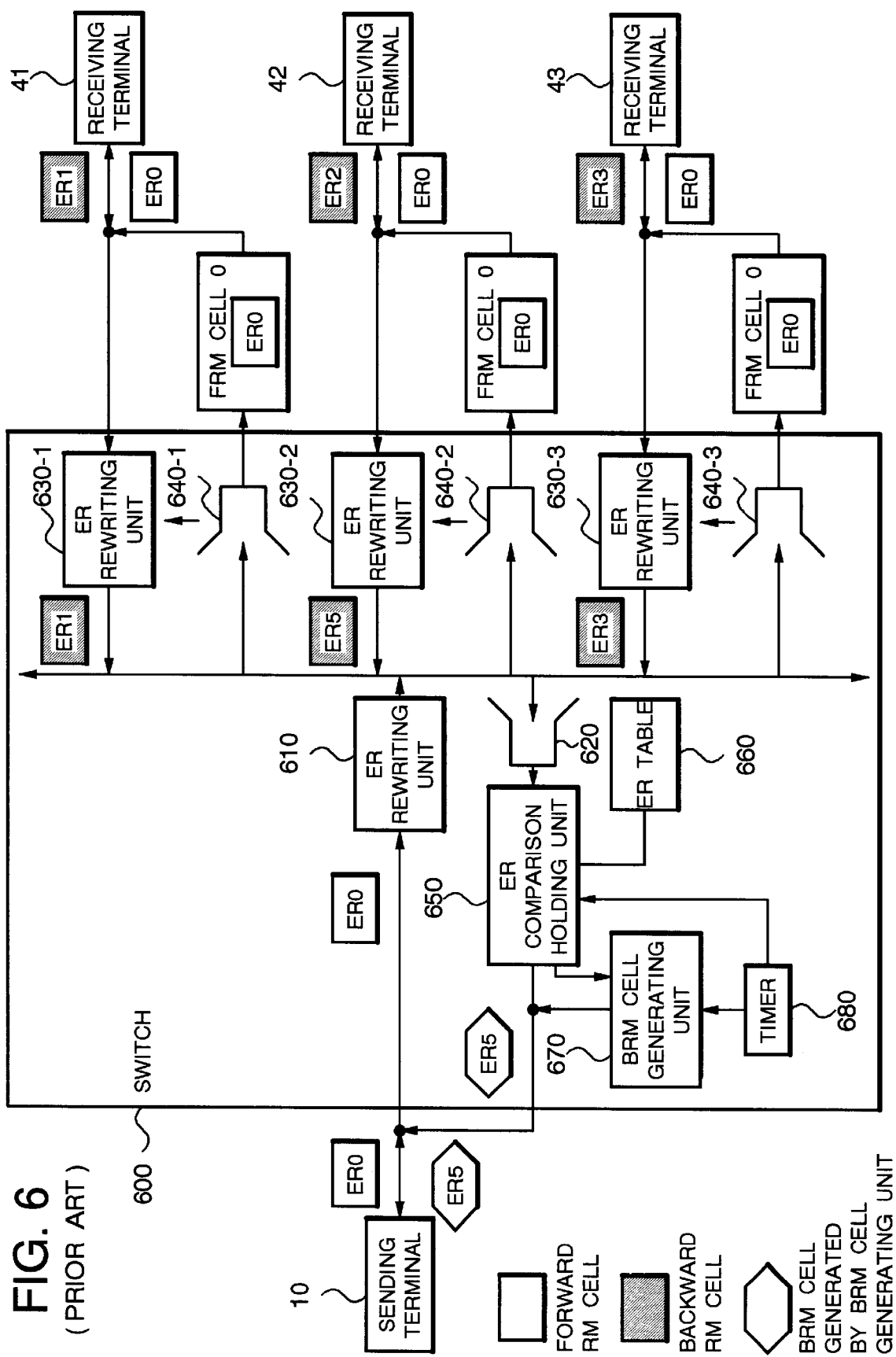
FIG. 6 is a block diagram showing another example of the structure of the conventional multi-cast ABR service system.
Figure 7:
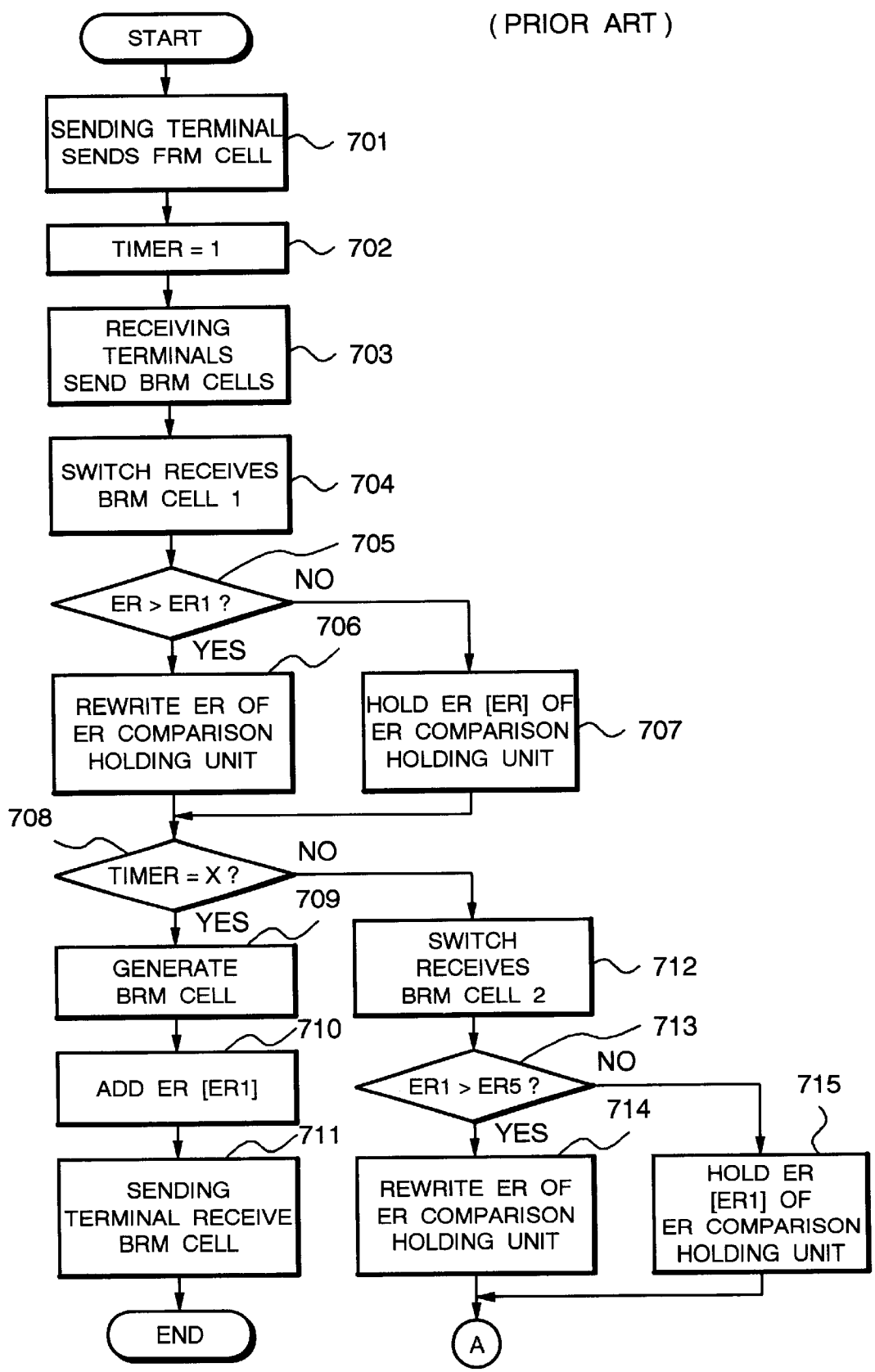
FIG. 7 is a flow chart showing the operation of the multi-cast ABR service system shown in FIG. 6.
Figure 8:
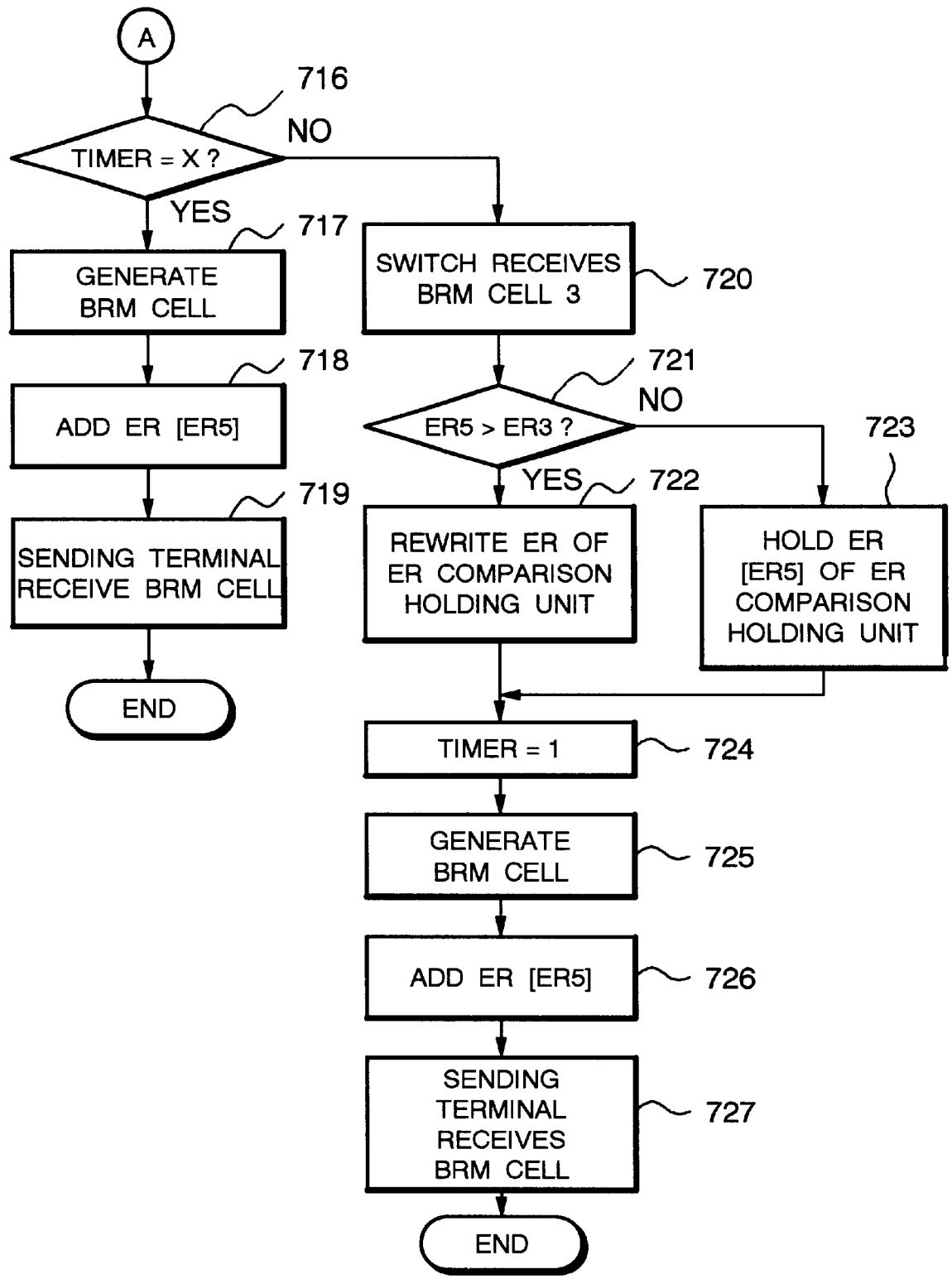
FIG. 8 is a flow chart showing the operation of the multi-cast ABR service system shown in FIG. 6.

With reference to the flow charts of FIGS. 2 and 3, the operation of the FRM/BRM converting unit 20 will be described further in detail.

First of all, the ER of the ER table 30 corresponding to the sending terminal 10 is set up at the maximum value (MAX rate) of the transferable rate as the initial value (Step 201). Thereafter, as mentioned above, the BRM cell 1 sent from the receiving terminal 41, the BRM cell 2 sent from the receiving terminal 42, the BRM cell 3 sent from the receiving terminal 43 reach the FRM/BRM converting unit 20 in this order. The receiving capable rate of the BRM cell 2 has been rewritten in [ER5] by the ER rewriting unit 130-2 in the switch 100.

The FRM/BRM converting unit 20 makes a comparison between the ER [ER] set up at the maximum in the ER table 30 and the ER1[ER] within the BRM cell 1 (Step 203), upon receipt of the BRM cell 1 at first (Step 202). When the ER [ER1] is smaller, the set-up value [ER] of the ER table 30 is rewritten into [ER1] (Step 204), and otherwise, the set-up value of the ER table 30 is held (Step 205). In this case, since the set-up value [ER] is the maximum value of the transferable rate, the receiving capable rate [ER1] of the receiving terminal 41 is usually smaller. Therefore, the set-up value of the ER table 30 would be rewritten.

Thereafter, when the FRM/BRM converting unit 20 receives an FRM cell before receiving the next BRM cell, it converts the received FRM cell into a BRM cell, and at this point, the ER being set up in the ER table 30 is written into the same BRM cell as the ER thereof, so to send it to the sending terminal 10. In this case, when the unit 20 receives an FRM cell before receiving the BRM cell 2, the FRM cell is converted into a BRM cell and the ER thereof is defined as [ER1], thereby to be sent to the sending terminal 10 (Steps 206 to 209).

When receiving the BRM cell 2 before receiving an FRM cell (Steps 206 and 210), the FRM/BRM converting unit 20 makes a comparison between the set-up value [ER1] of the ER table 30 and the ER [ER5] within the BRM cell 2 (Step 211). When the ER [ER5] is smaller, the set-up value [ER1] of the ER table 30 is rewritten into [ER5] (Step 212), and otherwise, the set-up value [ER1] of the ER table 30 is held (Step 213). In this case, since [ER5] is smaller as mentioned above, the set-up value of the ER table 30 will be rewritten.

When receiving an FRM cell before receiving the BRM cell 3, the received FRM cell is converted into a BRM cell (Steps 214 and 215), and the ER of the BRM cell is defined as [ER5] (Step 216), thereby to be sent to the sending terminal 10 (Step 217).

When receiving the BRM cell 3 before receiving an FRM cell (Steps 214 and 218), the unit 20 makes a comparison between the set-up value [ER5] of the ER table 30 and the ER [ER3] within the BRM cell 3 (Step 219). When the ER [ER3] is smaller, the set-up value [ER5] of the ER table 30 is rewritten into [ER3] (Step 220), and otherwise, the set-up value [ER5] of the ER table 30 is held (Step 221). In this case, since [ER5] is smaller as mentioned above, the set-up value [ER5] of the ER table 30 is held.

As mentioned above, having received all the BRM cells sent from the receiving terminals 41, 42, and 43, the FRM/BRM converting unit 20 waits for another FRM cell sent from the sending terminal 10. When the FRM cell is transmitted from the sending terminal 10, the FRM cell is broadcast to the respective receiving terminals 41, 42, and 43, and it is turned up by the switch 100 to be sent to the FRM/BRM converting unit 20. The FRM/BRM converting unit 20 converts the FRM cell into an BRM cell (Step 223) upon receipt of the FRM cell (Step 222), and the ER of the BRM cell is defined as [ER5] (Step 224), thereby to be sent to the sending terminal 10 (Step 225).

As set forth hereinabove, the multi-cast ABR service system and method of the present invention, by a comparison of the receiving capable rates within the BACKWARD RM cells sent from all the receiving terminals, defines the smallest value as the assured transferable rate in a connection route between the sending terminal and the receiving terminals, thereby making it possible to reflect the receiving capable rates of all the receiving terminals in the sending terminal. Therefore, the present invention enables the rate control capable of restraining the wasting rate of cell.

According to the present invention, a FORWARD RM cell sent by a sending terminal is converted into a BACKWARD RM cell and the transferable rate is mounted on the BACKWARD RM cell, so to be returned to the sending terminal itself, thereby making it unnecessary to generate a BACKWARD RM cell in a switch. Therefore, it can avoid making the structure of the switch complicated.

Further, according to the present invention, at the point of receiving the FORWARD RM cell sent from a sending terminal in the FRM/BRM converting unit for converting a FORWARD RM cell into a BACKWARD RM cell, the smallest value of the transferable rates within BACKWARD RM cells having received previously then is mounted on the converted BACKWARD RM cell, thereby to be returned to the sending terminal. Therefore, it can avoid such a situation that the sending terminal fails to receive BRM corresponding to the FRM cell having sent by the sending terminal and thereby it can avoid the risk of deterioration in reliability of a system.

What is claimed is:

1. A multi-cast ABR service system for performing multi-cast ABR services between a sending terminal and a plurality of receiving terminals connected together, comprising:

switching means for, upon receipt of a Forward RM cell sent from the sending terminal, broadcasting the Forward RM cell to the plurality of receiving terminals, and upon receipt of Backward RM cells returned from respective ones of the receiving terminals to the sending terminal, multiplexing and sending the Backward RM cells to the sending terminal, and turning back the Forward RM cell sent from the sending terminal so as to be returned to the sending terminal;

rate storing means for storing receiving capable rates mounted on the Backward RM cells sent from said switching means; and RM cell converting means for converting the Forward RM cell returned from said switching means into a Backward RM cell destined for the sending terminal, and for sending the converted Backward RM cell with one of the receiving capable rates stored in said rate storing means mounted thereon to the sending terminal.

2. A multi-cast ABR service system as set forth in claim 1, wherein said RM cell converting means, when receiving a Forward RM cell from said switching means, converts the Forward RM cell into a Backward RM cell and sends the Backward RM cell to said switching means, and when receiving a Backward RM cell from said switching means, extracts receiving capable rate of the Backward RM cell and stores the rate into said rate storing means.

3. A multi-cast service system as set forth in claim 1, wherein said RM cell converting means receives Backward RM cells of the respective receiving terminals sequentially sent from said switching means, makes a comparison between the respective receiving capable rates within the received Backward RM cells and the rate already stored in said rate storing means, in the receiving order, when the receiving capable rate within a Backward RM cell is smaller than the rate stored in said rate storing means, rewrites the rate in said rate storing means into the receiving capable rate within the Backward RM, and otherwise, holds the rate that is stored in said rate storing means.

4. A multi-cast service system as set forth in claim 1, wherein said RM cell converting means receives Backward RM cells of the respective receiving terminals sequentially sent from said switching means, makes a comparison between the respective receiving capable rates within the received Backward RM cells and the rate already stored in said rate storing means, in the receiving order, when the receiving capable rate within a Backward RM cell is smaller than the rate stored in said rate storing means, rewrites the rate in said rate storing means into the receiving capable rate within the Backward RM cell, otherwise, holds the rate that is stored in said rate storing means, and when receiving the Forward RM cell for the sending terminal from said switching means, the rate stored in said rate storing means at the point is mounted on the Backward RM cell which the Forward RM cell is converted into.

5. A multi-cast ABR service system as set forth in claim 1, wherein said rate storing means stores the maximum value of transferable rate as an initial value.

6. A multi-cast ABR service method for notifying receiving capable rates of respective receiving terminals to a sending terminal, in a multi-cast ABR service system for performing multi-cast ABR services between the sending terminal and the plurality of receiving terminals connected together, the method comprising:

a step of respectively extracting the receiving capable rates of the receiving terminals from the Backward RM cells which are sent from the receiving terminals in reply to the Forward RM cell sent from the sending terminal and storing the rates;

a step of turning back the Forward RM cell sent from the sending terminal so as to be returned to the sending terminal;

a step of converting the Forward RM cell returned from said switching means toward the sending terminal into a Backward RM cell destined to the sending terminal; and a step of mounting the receiving capable rate extracted in said rate extracting step on the converted Backward RM cell.

7. A multi-cast ABR service method as set forth in claim 6, wherein said rate storing step further including a step of sequentially making a comparison of the receiving capable rates within Backward RM cells sent from the respective receiving terminals, a step of rewriting the rate to be stored into the receiving capable rate extracted from the Backward RM cell when the receiving capable rate extracted from a Backward RM is smaller than the rate already stored, and a step of, otherwise, holding the rate already stored.

8. A multi-cast ABR service method as set forth in claim 6, wherein said rate storing step further including a step of sequentially making a comparison of the receiving capable rates within Backward RM cells sent from the respective receiving terminals, a step of rewriting the rate to be stored into the receiving capable rate extracted from the Backward RM cell when the receiving capable rate extracted from a Backward RM is smaller than the rate already stored, and a step of, otherwise, holding the rate already stored, and in said receiving capable rate mounting step, when the Forward RM cell sent from the sending terminal is returned to said switching means, the receiving capable rate stored at the point in said rate storing step is mounted on the Backward RM cell which the Forward RM cell is converted into.

* * * * *